June 6, 1967 A. O. MORSE 3,324,281
AUTOMATIC POSITIONING APPARATUS
Filed Jan. 7, 1963 3 Sheets-Sheet 2

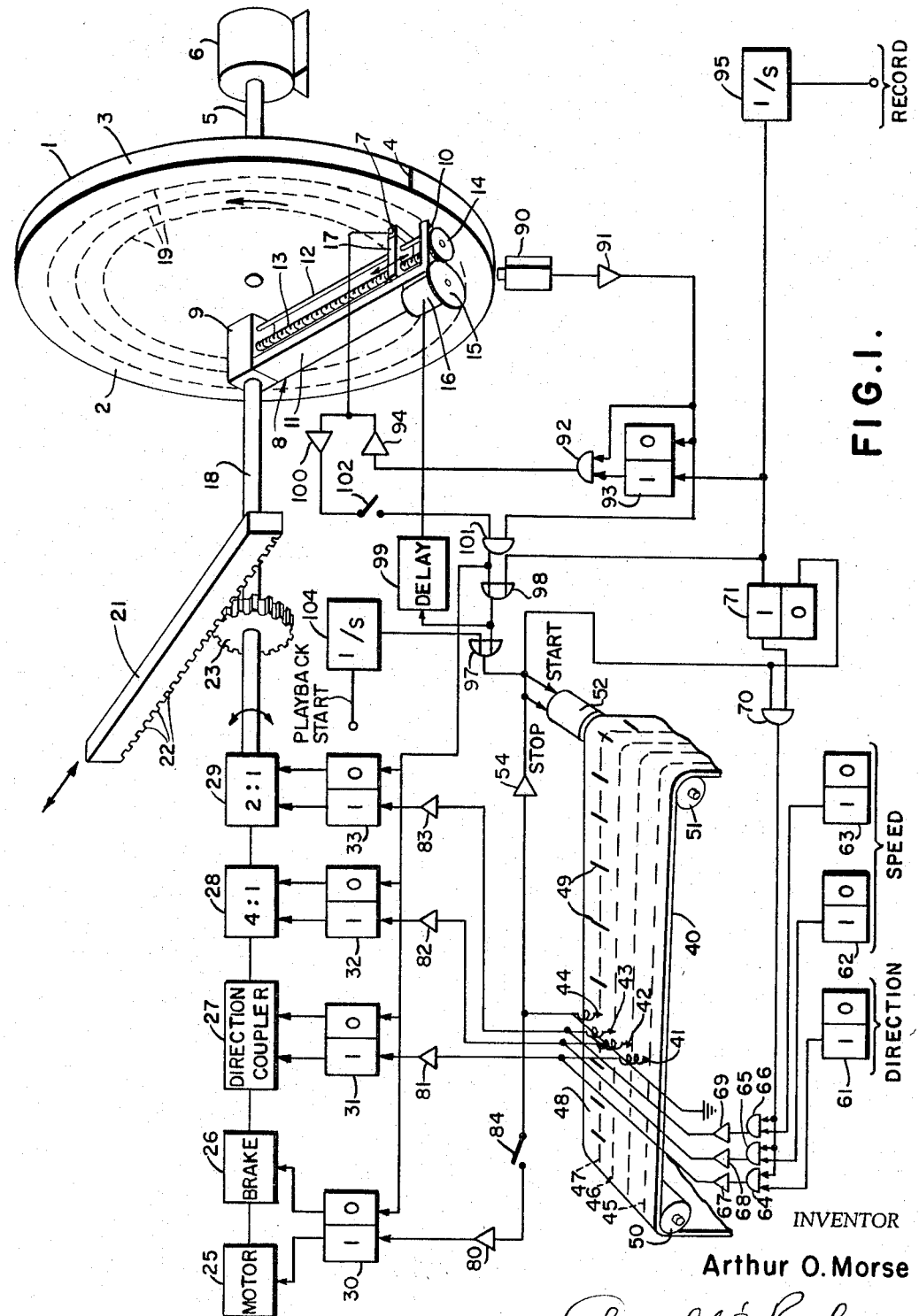

INVENTOR
Arthur O. Morse
BY Arnold & Roylance
ATTORNEY

INVENTOR
Arthur O. Morse
BY Arnold & Roylance
ATTORNEY

United States Patent Office 3,324,281
Patented June 6, 1967

3,324,281
AUTOMATIC POSITIONING APPARATUS
Arthur Osher Morse, Kensington, Md., assignor, by mesne assignments, to American Machine & Foundry Company, New York, N.Y., a corporation of New Jersey
Filed Jan. 7, 1963, Ser. No. 249,939
15 Claims. (Cl. 235—61.6)

This invention relates to automatic positioning apparatus, and more particularly to methods and apparatus for recording a position data program and for utilizing such a previously recorded position data program to automatically position a movable member.

Automatic positioning apparatus currently finds extensive use in automatic industrial machinery which is required in the ever increasing trend toward automation in order to offset ever rising labor costs. Most contemporary automatic positioning systems are basically numerical control systems utilizing combined digital and analog techniques. With such numerical control systems, the various successive desired locations of a movable member are precalculated, translated into digital computer language and then stored in a suitable storage medium such as punch cards or magnetic tape. Thereafter, a computer can extract the digital data from the storage medium and position the movable member, by means of suitable servomechanisms. Thus, the movable member is moved automatically to the successive precalculated locations, thereby tracing the locus of a desired movement. The expense of highly skilled personnel required for establishing the initial computer program and for maintaining the computer, as well as the expense of the computer itself, places limits on the amount of automatic machinery which can economically be justified. A substantial need therefore exists for automatic positioning apparatus which is less complex and which can more easily be programmed.

Present numerical control systems can be classified as of two basic types, namely, the incremental systems and the absolute systems. In the incremental systems, signal events or pulses are developed representing quanta of movement such that numerical position data can be obtained by means of a reversible counter responsive to the signal events or pulses. In other words, each of the possible required locations of the movable member is identified by a mark, all such marks being essentially the same and significant only by the relative position with respect to other marks, such that, each time a mark is encountered, a pulse is produced signifying a quantum of movement. The control instructions for incremental systems provide information regarding the direction of travel and the number of spaces to travel. Thus, these instructions can be characterized as taking the form "starting from a reference position, move 20 spaces to the right, then move 12 spaces to the left, then move 6 spaces to the left, etc."

In an absolute system, coded signals are developed in accordance with a numerical code such that the coded signals represent the present absolute position of an associated movable member. In other words, each of the possible required locations is identified by a significantly different mark so that the particular mark encountered causes a numerically coded signal to be developed identifying the position of the movable member. The control instructions for absolute systems provide numerical information designating successive desired positions of the movable member. These instructions can be characterized as taking the form "first move to position 36, then move to position 39, then move to position 12, etc."

The disadvantages encountered with the incremental and absolute systems are numerous. One disadvantage is that these systems require an encoding unit provided with the position indicating marks to perform the analog to digital conversion. Such encoding units must be accurately constructed with precision in order to obtain the desired spacing between the adjacent marks, and must be accurately aligned with respect to the movable member being positioned. Furthermore, the encoder required for absolute systems must be fairly elaborate in order to provide a different numerical coded signal for each of the different positions. These encoding units involve a considerable expense, particularly where accuracy is required. Another disadvantage is that the computers required in incremental or absolute systems often reach awesome proportions, particularly where a large number of program points and a large number of possible required locations are required. The computer usually requires a storage medium such as punch cards or magnetic tapes, apparatus for extracting data from the storage medium, temporary storage registers for holding the extracted data, additional temporary storage registers for holding the position data from the encoders, numerical comparators for comparing data in the registers, and logic circuitry for driving a movable member in accordance with the comparator output. Still another disadvantage is that the programming of these systems is relatively complex and usually requires highly trained and skilled personnel. The various program points are normally precalculated and must be converted to computer language and then stored in the storage medium.

In a copending application Ser. No. 245,294, filed Dec. 17, 1962, and now Patent No. 3,241,021, in the name of Schmidt et al. for an Automatic Positioning Apparatus, an entirely new system is set forth which is a complete departure from the earlier incremental and absolute systems. In accordance with this new system, marks are placed on a recording medium at locations indicative of desired locations of the associated movable member. The control instructions for this system merely indicate the necessary direction of travel required to reach a previously recorded mark. Thus, the instructions can be characterized as taking the form "starting from a reference position, move to the right until a previously recorded mark is detected, then move to the left until the next previously recorded mark is detected, etc."

This invention relates to an improvement of this new system wherein a continuously moving recording medium and positionable transducer are utilized instead of the arrangement in the copending application where the recording medium is stationary relative to a positionable transducer. An advantage of this improved apparatus is that the output signals provided by the positionable transducer are more substantial and have a better signal to noise ratio. This is particularly so when, for example, a magnetic recording medium is used since magnetic transducers responsive to a change of flux are considerably more efficient than transducers responsive to the flux itself. Accordingly, if the recording medium is continuously moving, the transducer can respond to the change of flux caused by a recorded magnetic mark passing adjacent the transducer. Another advantage is that an output signal can more easily be developed when the movable transducer is stationary, a situation which arises when the movable member rests on a program point.

A more detailed description is set forth in the following specification and accompanying drawings, the drawings forming a part of this specification, and wherein:

FIG. 1 is a diagrammatic perspective view of the apparatus and a schematic diagram of the associated control circuits in accordance with one embodiment;

Figure 3:
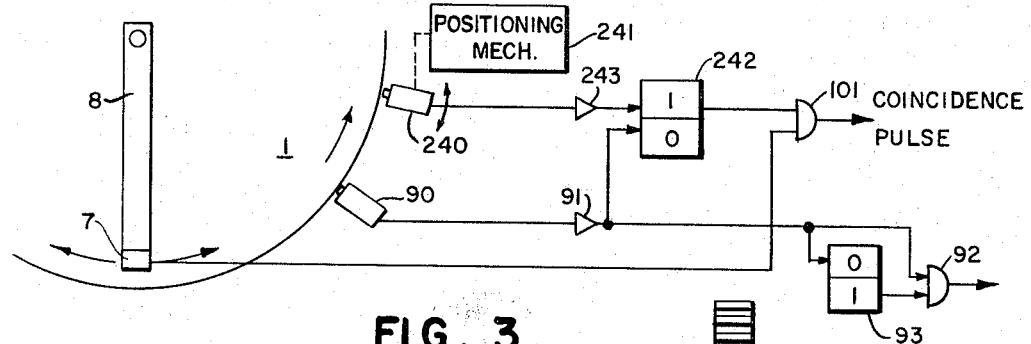
FIG. 3 is a schematic diagram illustrating a modification in accordance with still another embodiment.

The invention is illustrated in the various embodiments utilizing a continuously rotating magnetic recording disc having a reference mark thereon. A stationary transducer is responsive to the reference mark to provide a reference pulse once per revolution of the disc. A movable transducer is positionable angularly with respect to the surface of the magnetic disc such that the angular position of the movable transducer is always a function of a movable member position. When the apparatus is operated in the record mode, the movable transducer is actuated to record a magnetic mark only during the instant at which the stationary transducer detects the reference mark. The magnetic position mark thus recorded on the disc appears at an angular position with respect to the reference mark corresponding to the angular displacement between the transducers, and is thus indicative of the corresponding movable member position. When operated in the playback mode, the movable transducer is made responsive to the previously recorded position marks, and therefore detects this mark once per revolution of the disc. The movable transducer will detect the position mark at the same instant in which the stationary transducer detects the reference mark only if the angular displacement between the transducers is identical to the displacement at the time of recording the position mark. Accordingly, if the movable member and the movable transducer are set in motion and permitted to move until such time as the position mark and the reference mark are detected simultaneously, the position at which they stop corresponds to the positions they occupied when the position mark was previously recorded.

Referring to FIG. 1, the apparatus is illustrated including a disc 1 fabricated from aluminum or other nonmagnetic material, having a surface 2 and the periphery 3 coated with a suitable magnetizable material such as iron oxide. A fixed magnetic reference mark 4 is permanently recorded on the periphery of the disc. Disc 1 is fixed to a shaft 5 of a synchronous driving motor 6. When the driving motor is energized, disc 1 rotates counterclockwise at a suitable high angular velocity.

A movable magnetic read-write head 7 is positioned with respect to rotating disc 1 by an indexing and positioning mechanism 8. This mechanism includes a pair of spaced apart support blocks 9 and 10, the distance between the support blocks being approximately equal to the radius of disc 1. A rectangular slide bar 11 and a cylindrical slide bar 12 are secured to the opposing surfaces of the support blocks. A threaded shaft 13 is positioned between slide bars 11 and 12 and is suitably journaled in the support blocks extending beyond support block 10 and having a gear 14 affixed to the free end. A digital motor 16 is mounted on the rectangular slide bar on the side opposite support block 10. A gear 15 is secured to the shaft of digital motor 16, and the digital motor is so positioned that gear 15 meshes with gear 14. Read-write head 7 is secured to a head support member 17. This support member is provided with an internally threaded bore which accommodates threaded shaft 13, and a smooth bore which accommodates slide bar 12, the smooth bore being of sufficient diameter to avoid friction between the member and the slide bar. Thus, as threaded shaft 13 rotates, read-write head 7 is moved toward one of the support blocks.

Read-write head 7 is of conventional construction and preferably includes a generally C-shaped core piece which defines a small air gap positioned closely adjacent the surface of the magnetic disc. A winding is so placed on the core that, when the winding is energized, a flux is created across the air gap causing a magnetic mark to be recorded on the disc. As a previously recorded magnetic mark passes adjacent the air gap, a change of flux is sensed by the winding and an output pulse is provided accordingly.

Support block 9 is rigidly secured at one end of a shaft 18, such that the entire mechanism 8 rotates with the shaft, causing read-write head 7 to follow one of the concentric recording tracks 19 on the surface 2 of the disc. The radial spacing between adjacent recording tracks 19 is determined primarily by the size of the magnetic mark recorded when the read-write head is actuated, the spacing between adjacent tracks being sufficient to eliminate cross talk, i.e., interference of recorded marks on one track with recorded marks on an adjacent track. Digital motor 16 is of the type which makes one complete revolution each time it is actuated by an electrical pulse. The relative diameters of gears 14 and 15, and the pitch of the threads on the threaded shaft 13 are so selected that read-write head 7 moves to an adjacent track each time that digital motor is energized.

A movable member 21 is illustrated as an elongated solid bar rack having teeth 22 along the lower surface (as viewed). Teeth 22 mesh with teeth of a pinion gear 23 mounted on shaft 18. Accordingly, rotation of shaft 18 causes movable member 21 to move longitudinally while read-write head 7 moves angularly with respect to the disc.

Shaft 18 is rotated by a driving unit including a motor 25, an electromechanical brake 26, an electromechanical directional coupler 27, and a pair of electromechanical variable speed reducing units 28 and 29. The components making up the driving unit are selectively energized by four flip-flop multivibrator circuits 30–33. Each of the flip-flop circuits is essentially the same, having two stable states which, for convenience, are referred to as the "1" state and the "0" state. Whenever a potential is applied on the set input, the flip-flop circuit assumes the "1" state, providing a potential on the set output, the set input and output being those on the "1" side of the schematic representation. Whenever a potential is applied on the reset input, the flip-flop circuit assumes the "0" state and provides a potential on the reset output, the reset inputs and reset outputs being those on the "0" side of the schematic representation.

Electric motor 25 is a single speed motor which rotates in a clockwise direction when energized. The motor is connected to the set output of flip-flop circuit 30 and is, therefore, energized whenever a flip-flop circuit is in the "1" state. Electromechanical brake 26, when energized, clamps shaft 19 to prevent rotation and is connected to the reset output of flip-flop circuit 30. Thus, brake 26 is energized whenever flip-flop circuit 30 is in the "0" state. Since the flip-flop circuit is always in one or the other of the stable states, brake 26 is energized whenever motor 25 is not energized, and vice versa. Directional coupler 27 is of conventional design and, for example, incldes a number of gears interconnected through a pair of clutches such that the direction in which shaft 18 rotates depends upon which of the clutches are actuated. These clutches are connected respectively to the set and reset outputs of flip-flop circuit 31 such that, when the flip-flop circuit is in the "0" state, shaft 18 is conditioned for rotation in a clockwise direction and, when the flip-flop circuit is in the "1" state, shaft 18 is conditioned for rotation in a counterclockwise direction. Variable speed reduction units 28 and 29 are of conventional design and, for example, include a number of gears interconnected through a pair of clutches in each unit is connected to the reset output of the associated flip-flop circuit such that, when the flip-flop circuit is in the "0" state, the clutch is energized and no speed reduction results. The other clutch of the unit 29 is connected to the set output of flip-flop circuit 33 and causes a 2 to 1 speed reduction when energized in accordance with the "1" state of flip-flop circuit 33. Similarly, the other clutch in unit 28 is connected to the set output of flip-flop circuit 32 such that, when this flip-flop circuit is in the "1" state, a 4 to 1 speed reduction results. Speed reduction units 28 and 29 are serially connected, providing a cumulative speed reduction of 8 to 1 when both of the associated flip-flop circuits are in the "1" state.

The respective states of flip-flop circuits 31–33 can be represented as a three-digit binary number with the state of circuit 31 being the leftmost digit and the state of circuit 33 being the rightmost digit. The following table summarizes the various directions of rotation and speed reductions corresponding to the eight possible numerical combinations.

TABLE I

| Code | Speed Reduction | Direction |
| --- | --- | --- |
| 0 0 0 | None | CW |
| 0 0 1 | 2:1 | CW |
| 0 1 0 | 4:1 | CW |
| 0 1 1 | 8:1 | CW |
| 1 0 0 | None | CCW |
| 1 0 1 | 2:1 | CCW |
| 1 1 0 | 4:1 | CCW |
| 1 1 1 | 8:1 | CCW |

The binary data for controlling the flip-flop circuits 30–33 is recorded on conventional magnetic tape 40 which is of sufficient width to accommodate four separate recording tracks. Four magnetic read-write heads 41–44 are spaced apart transversely across the tape at positions co-operating respectively with recording tracks 45–48; recording track 48 has a plurality of equally spaced magnetic timing marks 49 permanently recorded thereon. Magnetic tape 40 advances in a horizontal plane from left to right (as viewed) from an idler roller 50 to a driven roller 51. Driven roller 51 is mounted on the shaft of electric motor 52 and can be provided with sprockets engaging suitably spaced apertures along the edges of the magnetic tape when a more positive driving engagement is required. Electric motor 52, preferably, includes a bi-stable control switch (not shown), such as an electromagnetic latching relay. Thus, when the start input to motor 52 is energized, the relay latches energizing the motor to advance the magnetic tape, and when the stop input is subsequently energized the relay is unlatched, deenergizing the motor causing the tape to coast to a stop somewhere between an adjacent pair of magnetic timing marks 49.

Data to be recorded on tape 40 is placed in flip-flop multivibrator circuits 61–63, these circuits being essentially the same as corresponding flip-flop circuits 31–33. The respective states of the flip-flop circuits 61–63 are established (by conventional circuits not shown) in accordance with one of the three-digit binary numbers in Table I. The set outputs of circuits 61–63 are connected respectively to one input of AND circuits 64–66, respectively. These AND circuits are of the type that produce an output potential whenever a similar potential is applied simultaneously to the two inputs. The output of AND circuits 64–66 are connected via suitable pulse amplifiers 67–69, respectively, to read-write heads 41–43. The other inputs of AND circuits 64–66 are connected to the output of a similar two-input AND circuit 70. Read-write head 44 is connected to the stop input of motor 52 and to the other input of AND circuit 70 via pulse amplifier 54.

When it is desired to record the data temporarily stored in circuits 61–63, the start input of electric motor 52 is momentarily energized, causing the motor to advance the tape past the next one of the timing marks 49. Assume for the moment that AND circuit 70 is conditioned, i.e., the input connected to flip-flop circuit 71 is energized, so that when a timing mark passes beneath read-write head 44, a pulse is developed which passes through conditioned AND circuit 70 to AND circuits 64–66. Those of the AND circuits 64–66 which are connected to respective flip-flop circuits 61–63 which are in the "1" state, are conditioned and permit the pulse to pass through to energize selected ones of read-write heads 41–43. Accordingly, the three-digit binary number which is stored in circuits 61–63 is transferred to the magnetic tape and is recorded on a transverse line passing across tracks 45–47 and through the associated timing mark. The presence of a magnetic mark corresponds to a "1" in the code, and the absence of a mark corresponds to a "0". The pulse developed by read-write head 44 is also applied to the stop input of motor 52 and, therefore, the motor coasts to a stop shortly after the timing mark passes beneath read-write head 44.

Data recorded on a magnetic tape 40 can subsequently be transferred to flip-flops 31–33, respectively, via pulse amplifiers 81–83 connected between read-write heads 41–43 and the set inputs of the respective flip-flop circuits. Read-write head 44 is connected to the set input of circuit 30 via switch 84 and a pulse amplifier 80. When it is desired to transfer data from the magnetic tape, switch 84 is closed and the start input of electric motor 52 is energized causing the tape to advance. When a timing mark subsequently passes beneath read-write head 44, a pulse is generated which places circuit 30 in the "1" state, thereby releasing brake 26 and energizing motor 25. As the timing mark passes beneath read-write head 44, the corresponding magnetic marks in tracks 45–47 pass beneath read-write heads 41–43, developing pulses, placing selected ones of circuits 31–33 in the "1" state. The respective established states of circuits 31–33 are in accordance with the binary number previously transferred to the tape from corresponding circuits 61–63. Units 27–29 are actuated accordingly, bringing about a rotation of shaft 18 in a direction and with a speed reduction in accordance with the three digit binary number previously recorded.

A stationary read head 90 is positioned relative to the periphery of disc 1 and provides an electrical reference pulse once per revolution in response to the reference mark 4. Read head 90 is of conventional design, similar to read-write head 7, and is responsive to the change of flux provided as the magnetic reference mark 4 passes adjacent the head. The pulses provided by read head 90 are utilized in co-ordinating the recording of program marks on disc 1 and in subsequent detection of these marks.

The circuits utilized to control the recording of magnetic position marks on disc 1 include a flip-flop multivibrator circuit 93 and a two-input AND circuit 92, both of the type previously described. One input of AND circuit 92 is connected to the set output of circuit 93. The other input of AND circuit 92 and the reset input of circuit 93 are connected to receive the pulses developed by read head 90 via pulse amplifier 91. The output of AND circuit 92 is connected to energize read-write head 7 through a pulse amplifier 94. A one-shot multivibrator circuit 95 of conventional design produces an electrical pulse to initiate the recording operation when suitably actuated. The output from the circuit 95 is connected to the set input of flip-flop circuit 93.

When it is desired to record a magnetic position mark on disc 1, movable member 21 is first placed at a location corresponding to the position to be recorded. Movable member 21 can be positioned by releasing brake 26 and manually moving the movable member, or by selectively actuating certain ones of the units 25–29 by means of manual control circuits not shown. Read-write head 7 is automatically positioned at an angular displacement with respect to stationary head 90 corresponding to the movable member position. The one-shot circuit 95 is then actuated, placing circuit 93 in the "1" state, thereby conditioning AND circuit 92. Thereafter, as soon as magnetic reference mark 4 passes adjacent read head 90, a reference pulse is developed which passes through conditioned AND circuit 92, energizing read-write head 7 to record a position mark on the disc. The position mark is recorded simultaneously with the occurrence of the reference pulse, and, therefore, the position mark, so recorded, is at an angular position with respect to reference mark 4 corresponding to the angular displacement between movable read-write head 7 and stationary read head 90. The pulse developed by read head 90 is also applied to the reset input of circuit 93 causing this circuit to again assume the "0" state. The time interval required for flip-flop circuit 93 to change state is sufficient to permit the same pulse to have previously passed through conditioned AND circuit 92.

The output of one-shot circuit 95 is connected to one input of an OR circuit 98. The output of the OR circuit 98 is connected to digital motor 16 through a time delay circuit 99. The OR circuit is of the type which presents a potential at the output whenever a similar potential is applied to either of the inputs. Accordingly, the pulse developed by one-shot circuit 95, which causes recordination of a position mark, also passes through OR circuit 98 and delay circuit 99 to actuate digital motor 16. This indexes read-write head 7 to an adjacent track approxiate for recording the next position mark. The time delay of circuit 99 is equivalent to the time required for one complete revolution of disc 1 to thereby insure that the position mark is recorded prior to read-write head 7 being indexed.

The output of OR circuit 98 is also connected to the input of a similar two-input OR circuit 97, the output of OR circuit 97 being connected to the start input of electrical motor 52. The output of one-shot circuit 95 is also connected to the set input of circuit 71, the set output of circuit 71 being connected to one of the inputs of the inputs of AND circuit 70. Read-write head 44 is connected to the reset input of circuit 71 via pulse amplifier 54. Thus, the same pulse from one-shot circuit 95 which causes recordation of the position mark on disc 1 also initiates the transfer of numerical data from circuits 61–63 onto magnetic tape 40 in the manner previously described. The binary data recorded on the tape is that which actuates the driving unit during the playback operation so that read-write head 7 will reach the position mark which is recorded simultaneously with the recording of the binary data.

During the playback operation, it is necessary to detect when a position mark and the reference mark are simultaneously detected. Accordingly, the output of read head 90 is connected to one-input of an AND circuit 101 via pulse amplifier 91, and the output of read-write head 7 is connected to the other input of AND circuit 101 via a pulse amplifier 100 and a switch 102. AND circuit 101 is of the type which provides an output pulse whenever pulses are received on both inputs simultaneously. Accordingly, when read-write head 7 is angularly displaced from stationary head 90 with the same displacement as exists between a position mark and the reference mark 4, read head 90 and read-write head 7 simultaneously provide an output pulse which in turn produces an output pulse from AND circuit 101.

The output from AND circuit 101 is connected to the reset inputs of circuits 30–33 causing each of these circuits to assume the "0" state when an output pulse occurs. When circuit 30 assumes the "0" state, motor 25 is denergized and brake 26 is applied causing movable member 21 to stop. When circuits 31–33 assume the "0" state, they are reset and thus conditioned to receive the next set of numerical data from the tape 40. The output of AND circuit 101 is also connected to an input of OR circuit 98. The output pulse developed by AND circuit 101 therefore passes through OR circuit 98 and delay circuit 99 to actuate digital motor 16. Thus, when coincidence is detected between a position mark and the reference mark, digital motor 16 is actuated indexing read-write head 7 to an adjacent track where the next position mark can be found. The output pulse from AND circuit 101 also passes through OR circuits 98 and 97 to actuate motor 52, thus initiating the transfer of a new binary number from tape 40 to circuits 31–33.

When recording a complete program, i.e., a number of separate program points, switches 84 and 102 are placed in the open position and read-write head 7 is moved to the outermost track. Movable member 21 is then manually positioned in accordance with the first program point position, and a three-digit binary number is placed in circuits 61–63 in accordance with the desired direction and speed which the movable member should take in reaching the first program point position in the playback mode. One-shot circuit 95 is then actuated to produce a record pulse. This pulse is applied to flip-flop circuit 93 which conditions AND circuit 92. Shortly therefore, when reference mark passes adjacent read head 90, a reference pulse is developed, which passes through the conditioned AND circuit, actuating read-write head 7 to record a position mark at the appropriate location on disc 1, and which resets circuit 93. The record pulse also passes through OR circuit 98 and delay circuit 99 to actuate digital motor 16, which in turn indexes read-write head 7 to the adjacent track following the recording to the position mark. The record pulse also is applied to flip-flop circuit 71, which conditions AND circuit 70, and to the start input of motor 52 via OR circuits 98 and 97. Motor 52 advances magnetic tape 40 so that, when a timing mark is detected by read-write head 44, a pulse is developed which passes through AND circuit 70 conditioning AND circuits 64–66 to transfer the data from circuits 61–63 to the magnetic tape via read-write heads 41–43. The pulse developed by read-write head 44 also causes denergization of motor 52 and resets circuit 71, and thus the recording of the first program point is complete. Additional successive program points are similarly recorded on separate tracks 19 of disc 1 and on separate transverse locations on magnetic tape 40.

When it is desired to operate the apparatus in the playback mode, movable member 21 and magnetic tape 40 are placed in their initial positions, read-write head 7 is moved to the outermost track and switches 102 and 84 are closed. A one-shot multivibrator circuit 104, which is similar to circuit 95, has the output thereof connected to one of the inputs of OR circuit 97. This one-shot circuit is then actuated to produce an output pulse which passes through OR circuit 97 and actuates motor 52 causing magnetic tape 40 to advance. As the first timing pulse passes beneath read-write head 44, the corresponding numerical data on the magnetic tape passes through pulse amplifiers 81–83 placing circuits 31–33 in respective states corresponding to the numerical data. As the timing pulse passes beneath read-write head 44, a pulse is generated by read-write head 44, which passes through pulse amplifier 80 placing circuit 30 in the "1" state; thereby energizing motor 25 and releasing brake 26. Accordingly, shaft 18 rotates at a speed and in a direction as determined by units 27–28 in accordance with the binary number appearing in circuits 31–33. The pulse developed by read-write head 44 is also applied to the stop input of motor 52 and, therefore, magnetic tape 40 comes to rest prior to the second timing mark reaching read-write head 44.

Shaft 18 continues to rotate until read-write head 7 reaches an angular position with respect to stationary read head 90 corresponding to the angular displacement between the first position mark and reference mark 4. Prior to reaching this correct angular displacement, read-write head 7 and read head 90 each detect their associated magnetic mark once per revolution of disc 1. However, these marks are not detected simultaneously and, therefore, no output pulse is developed by AND circuit 101. However, when the appropriate angular displacement is achieved, the output pulses from read-write head 7 and read head 90 will occur simultaneously and, therefore, AND circuit 101 produces an output pulse. This output pulse causes circuits 30–33 to assume the "0" state, thereby deenergizing motor 25 and resetting circuits 31–33 for a new set of binary data. The output pulse from AND circuit 101 also passes through OR circuit 98 and delay circuit 99 to actuate digital motor 16 to index read-write head 7 to an adjacent track inwardly. The output pulse from AND circuit 101 also passes through OR circuits 98 and 97 to again start motor 52 to advance tape 40. As tape 40 advances, a new set of numerical data is similarly transferred to circuits 31–33, and motor 25 is again energized when circuit 30 assumes the "1" state. When motor 25 is energized, movable member 21 and read-write head 7 move toward the position corresponding to the second position mark recorded on disc 1. Thereafter, when the appropriate position is reached, motor 25 is again deenergized and a new set of data is transferred from magnetic tape 40 to circuits 31–33. This operation continues in this manner automatically positioning movable member 21 successively in accordance with the successive recorded program points.

Figure 2A:
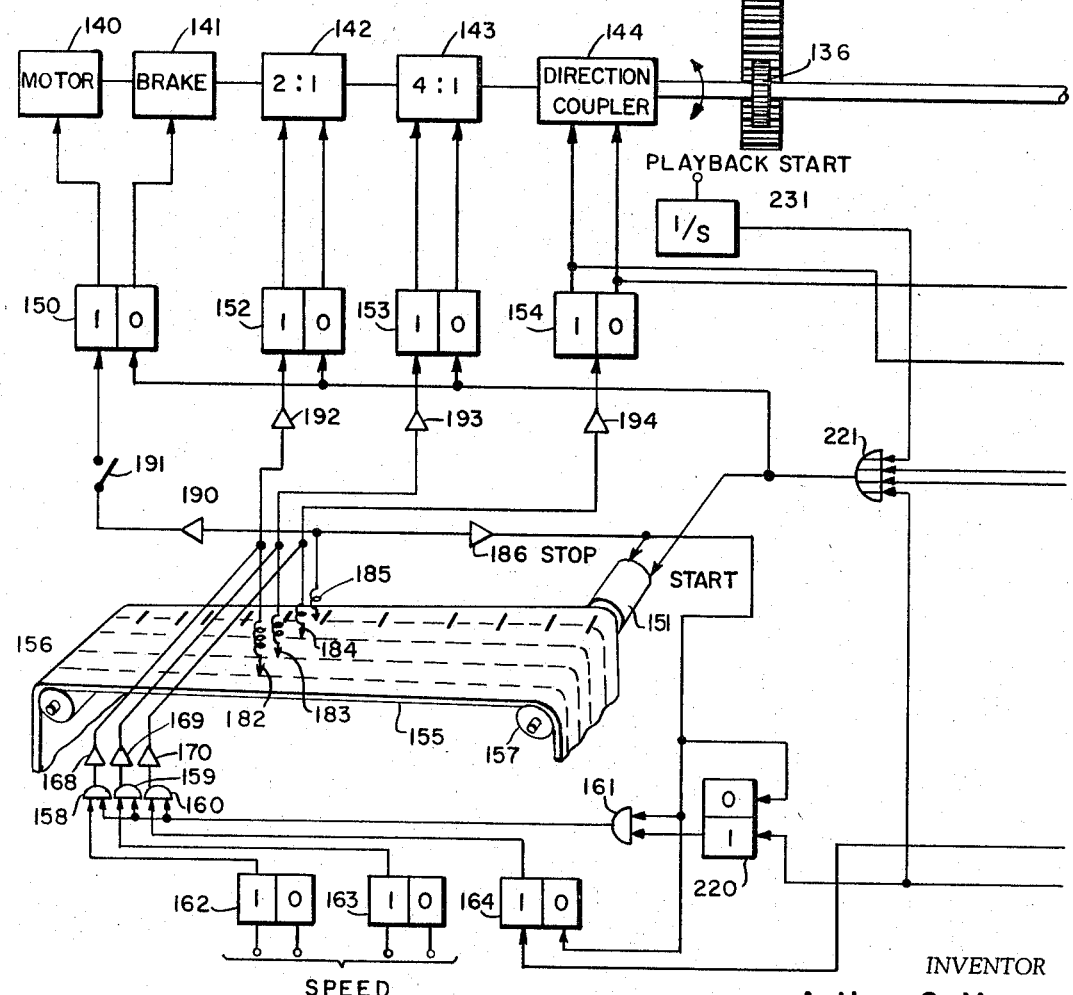
FIGS. 2a and 2b are portions of the same schematic diagram of the apparatus and associated control circuits in accordance with another embodiment.
Figure 2B:
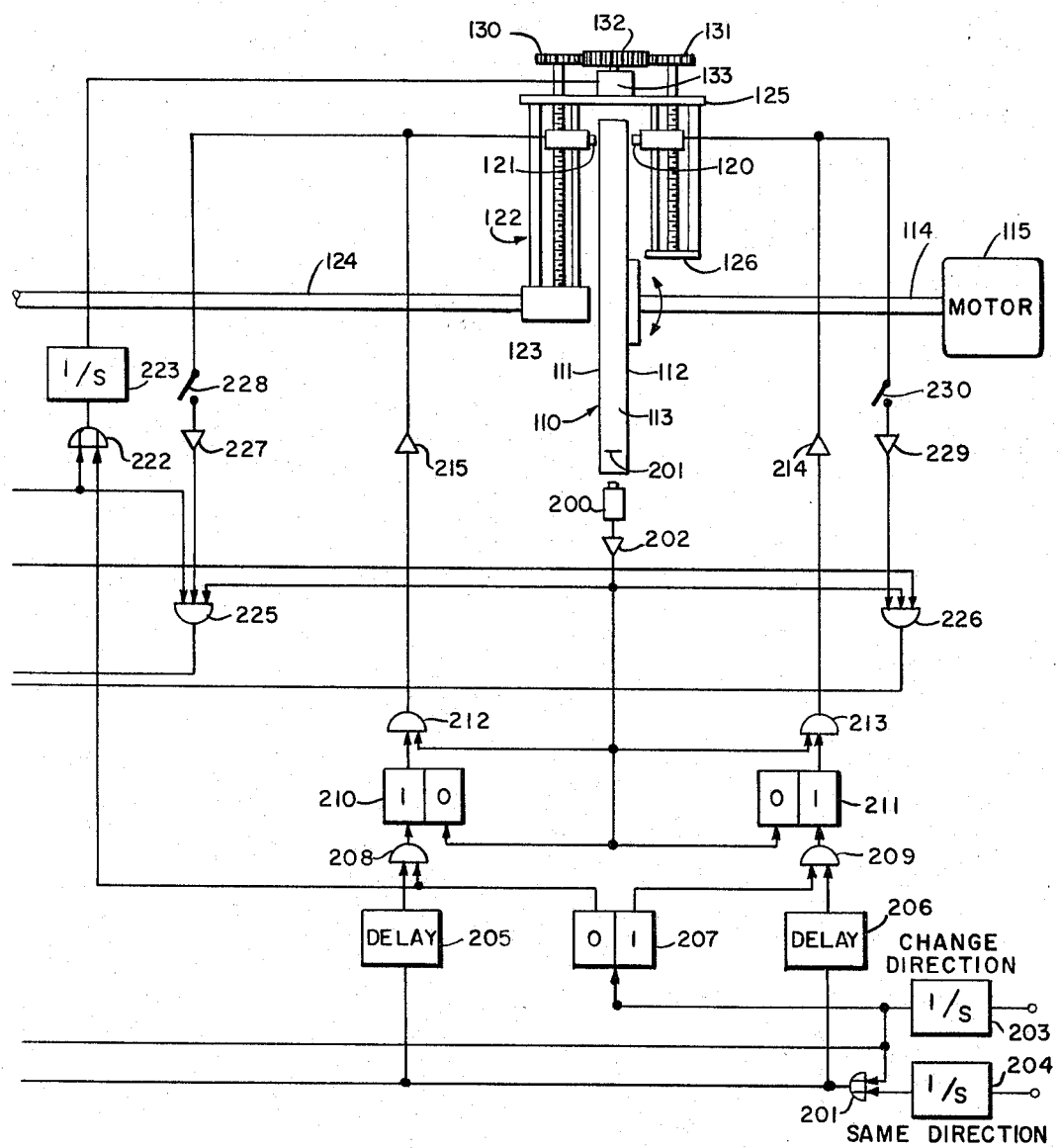

In many installations it is necessary to more efficiently utilize the available space on the recording medium in order to increase the program point capacity. The apparatus illustrated in FIG. 2 is of this type and utilizes recording tracks on both sides of a continuously rotating magnetic recording disc, and is operable to record a plurality of successive program points on the same track.

When operating in the record mode, as many successive program points as can be reached by traveling in the same direction are recorded on the same track on one side of the disc. Thereafter, as many successive program points as can be reached by traveling in the opposite direction are recorded in a corresponding magnetic track on the opposite side of the disc. The write heads used in recording are then indexed to an adjacent pair of tracks and the recording operation continues.

When operating in the playback mode, a pair of read heads are utilized operative to read magnetic marks recorded respectively in a pair of tracks on opposite sides of the disc. Each time a position mark is detected, the movable member stops and, shortly thereafter, begins moving toward the next program point. Each time the last position mark on a track is detected, the movable member changes direction and the head on the opposite side of the disc is actuated to detect the next successive position mark. When the last position mark in each of a pair of tracks has been detected, the read heads are indexed to a pair of adjacent tracks.

A magnetic disc 110, constructed of aluminum or other non-magnetic material, has sides 111 and 112 and the periphery 113 coated with a suitable magnetizable material, such as iron oxide. Disc 110 is affixed to a shaft 114 of a synchronous driving motor 115. When energized, the driving motor rotates disc 110 at a suitable high, angular velocity.

Read-write heads 120 and 121 are operative to record magnetic marks and read magnetic marks from sides 111 and 112, respectively. The read-write heads are supported by a positioning and indexing mechanism 122. The portion of the positioning and indexing mechanism which supports read-write head 121 is similar to that previously described in FIG. 1. This portion of the mechanism includes a pair of spaced apart support blocks 123 and 125 with suitable slide bars secured between the support blocks. A head support member affixed to read-write head 121 is adapted to slide along the slide bars and includes an internally threaded aperture adapted to cooperate with an externally threaded shaft journaled in the support blocks 123 and 125. Support block 125 is elongated and passes over the edge of disc 110 to the other side of the disc. Read-write head 120 is supported by a similar mechanism affixed to support block 125 and having a spaced apart support block 126, spaced at a distance somewhat less than the radius of disc 110. Suitable slide bars are affixed between support blocks 125 and 126. A head support member affixed to read-write head 120 is adapted to slide along the slide bars and is internally threaded to cooperate with the external threads of a threaded shaft journaled in support blocks 125 and 126.

Gears 130 and 131 are affixed to the free ends of the threaded shafts which extend beyond support block 125. A digital motor 133 is secured approximately in the center of support block 125 such that a gear 132 affixed to the shaft of the motor meshes with gears 130 and 131. Digital motor 133 is of the type which makes one complete revolution upon actuation by a suitable electrical pulse. The relative diameters of gears 130–132 and the pitch of the threaded shafts are suitably selected so that, upon one complete revolution of digital motor 133, read-write heads 120 and 121 are simultaneously indexed to an adjacent track on disc 110. In other words, the distance which the read-write heads move when the digital motor is actuated establishes the positions of pairs of concentrically located tracks on opposite sides of the disc, the spacing between adjacent tracks being sufficient to prevent any substantial cross talk between adjacent tracks.

Support block 123 is connected to one end of a shaft 124 such that, as the shaft rotates, the read-write heads 120 and 121 are simultaneously moved along respective circular tracks on opposite sides of the disc. The angular position of the heads always corresponds to the angular position of shaft 124. A movable member 135, shown as an elongated rack, cooperates with a pinion gear 136, the pinion gear being affixed to shaft 124. Thus, as shaft 124 rotates, movable member 135 moves along its longitudinal axis.

A driving unit for rotating shaft 124 includes an electric motor 140, an electromechanical brake 141, a pair of variable speed reduction units 142 and 143, and a directional coupler 144. The individual units making up the driving unit are essentially the same as units 25–29 in FIG. 1, and are controlled respectively by flip-flop multivibrator circuits 150, 152, 153 and 154 in essentially the same manner.

Magnetic tapes 155 and the associated circuits for recording data on the magnetic tape are essentially the same as those previously described in detail in FIG. 1. Magnetic tape 155 advances from an idler roller 156 toward a driven roller 157, the driven roller being rotated by an electric motor 151. Data to be recorded on the magnetic tape is temporarily stored in flip-flop circuits 162–164 in accordance with the code set forth in Table II.

TABLE II

| Code | Speed Reduction | Direction |
|---|---|---|
| 0 0 0 | None | Same. |
| 1 0 0 | 2:1 | Do. |
| 0 1 0 | 4:1 | Do. |
| 1 1 0 | 8:1 | Do. |
| 0 0 1 | None | Change. |
| 1 0 1 | 2:1 | Do. |
| 0 1 1 | 4:1 | Do. |
| 1 1 1 | 8:1 | Do. |

The leftmost digit of the code corresponds to the state of circuit 162 and the rightmost digit of the code corresponds to state of circuit 164. When it is desired to transfer the numerical data from circuits 162–164 to magnetic tape 155, the start input of motor 152 is actuated, causing tape 155 to advance. As soon as one of the timing marks is detected by read-write head 185, a pulse is developed which passes through a pulse amplifier 186 and through AND circuit 161 (assuming that this AND circuit is conditioned) thereby placing AND circuits 158–160 in the conditioned state. When AND circuits 158–160 are conditioned, the data stored in circuits 162–164 is transferred to the magnetic tape via pulse amplifiers 168–170 and read-write heads 182–184, respectively.

Read-write head 185 is connected to the set input of flip-flop circuit 150 via a pulse amplifier 190 and a switch 191. Flip-flop circuit 150 is placed in the "1" state, energizing motor 140, when a timing mark is detected by read-write head 185. Read-write heads 182 and 183 are connected to the set inputs, respectively, of flip-flop circuits 152 and 153 via pulse amplifiers 192 and 193. Accordingly, whenever a magnetic mark is detected by read-write heads 182 and 183, the associated flip-flop circuit is placed in the "1" state.

Read-write head 184 is connected to the symmetrical input of a binary multivibrator circuit 154 through a suitable pulse amplifier 194. The binary circuit has two stable states referred to as the "1" state and the "0" state and changes from one state to the other each time a pulse is applied to the symmetrical input. The set and reset outputs of binary circuit 154 are connected to the clutches of directional coupler 144 such that shaft 124 can rotate clockwise when the binary circuit is in the "0" state, and counterclockwise when the binary circuit is in the "1" state.

A stationary read head 200 is positioned adjacent the periphery of disc 110 and is responsive to a permanently recorded reference mark 201 on the periphery of the disc. Read head 200 provides a reference pulse in response to the reference mark 201 passing adjacent the head, and produces this reference pulse once per revolution of the disc.

The recording circuits for recording position marks on disc 110 include a pair of one-shot multivibrator circuits 203 and 204, one or the other of these circuits being actuated when a position mark is to be recorded. The one-shot multivibrator circuits are of the type previously described and produce an output pulse when actuated. The output of one-shot circuit 203 is connected to the symmetrical input of a binary multivibrator circuit 207. The output of one-shot circuits 203 and 204 are both connected to the inputs of a two-input OR circuit 201. One input of a two-input AND circuit 208 is connected to the reset output of binary circuit 207, and one input of a two-input AND circuit 209 is connected to the reset output of the binary circuit, the other inputs of the AND circuits being connected to the output of OR circuit 201 via time delay circuits 205 and 206, respectively. The output of AND circuits 208 and 209 are connected to the set input of flip-flop multivibrator circuits 210 and 211, respectively, and the reset inputs of circuits 210 and 211 are connected to receive reference pulses from read head 200 via a pulse amplifier 202. An AND circuit 212 has one input connected to the set output of circuit 210 and an AND circuit 213 has one input connected to the set output of circuit 211, the other inputs of these AND circuits being connected to read head 200 to receive reference pulses via amplifier 202. The output of AND circuits 212 and 213 are connected to actuate read-write heads 121 and 120, respectively, via pulse amplifiers 215 and 214.

The circuit for automatically initiating the transfer of data from flip-flop circuits 162–164 to the magnetic tape includes a flip-flop multivibrator circuit 220 having the set input thereto connected to the output of OR circuit 201. The set output of this flip-flop circuit is connected to one of the inputs of AND circuit 161 to condition the AND circuit when the flip-flop circuit is in the "1" state. Flip-flop circuit 164 has the set input connected to the output of one-shot circuit 203. Reset inputs of flip-flop circuits 164 and 220 are connected to read-write head 185 via amplifier 186 to receive electrical pulses developed in response to timing marks on tape 155. The output of OR circuit 201 is connected to one of the inputs of a four input OR circuit 221, this OR circuit being of the type which provides an output potential when any one of the inputs is energized.

The circuit for actuating digital motor 133 during the record mode includes a two-input OR circuit 222, one of the inputs of which is connected to the reset output of binary circuit 207. A one-shot circuit 223 is connected to the output of OR circuit 222 and is responsive to a change of potential in the positive direction which occurs when binary circuit 207 changes from the "1" state to the "0" state. The output of one-shot circuit 223 is connected to digital motor 133 to provide the appropriate electrical pulse to actuate the digital motor.

When operating in the record mode, the apparatus is so arranged that as many successive program points which can be reached by traveling in the clockwise direction are recorded on side 111 of the disc via read-write head 121. As many successive points thereafter as can be reached by traveling in the counterclockwise direction are recorded on the opposite side 112 of the disc via read-write head 120. When one or more pulses has been recorded on both sides of the disc, the digital motor 133 is actuated indexing the read-write heads 120 and 121 inwardly to an adjacent pair of tracks. Each time a program point is recorded via either one of the read-write heads 120 or 121, the corresponding data is transferred from flip-flop circuits 162–164 to the magnetic tape.

More specifically, the apparatus is conditioned for recording the first program point by positioning read-write heads 120 and 121 at radial positions corresponding to the outermost pair of recording tracks, preferably close to the periphery of disc 110, and by placing binary circuit 207 in the "0" state. Assuming that the first program point corresponds to a location which can be reached by rotating shaft 124 in the clockwise direction, this program point is recorded by first positioning movable member 135 to the desired location and then actuating one-shot circuit 204. Since binary circuit 207 is in the "0" state, AND circuit 208 is conditioned and, therefore, the pulse developed by one-shot circuit 204 passes through OR circuit 201, delay circuit 205 and conditioned AND circuit 208 to place circuit 210 in the "1" state, thereby conditioning AND circuit 212. As soon thereafter as reference mark 201 is detected by read head 200, a reference pulse is provided which passes through conditioned AND circuit 212 and amplifier 215 to actuate read-write head 121, thereby recording a position mark on disc 110. Since the angular displacement between read-write head 121 and read head 200 corresponds to the position of movable member 135, the position mark is automatically recorded at a location on the disc with respect to reference mark 201 which is indicative of the movable member position. AND circuit 209 is not conditioned and, therefore, no pulse is applied to read-write head 120. The output pulse from one-shot circuit 204 is also applied to electric motor 151 via OR circuit 221 causing tape 155 to advance. The output pulse from one-shot circuit 204 also places flip-flop circuit 220 in the "1" state to condition AND circuit 161 so that, when a timing mark is subsequently detected by read-write head 185, the pulse passes through the conditioned AND circuit to cause transfer of data from circuits 162–164 to the magnetic tape. Flip-flop circuits 162 and 163 have been previously set in accordance with the desired rotational speeds during playback operation for reaching the first program point, and binary circuit 164 remains in the "0" state, since no change of direction is required to reach the first program point.

As many additional successive program points as can be reached by traveling in the clockwise direction are each recorded in essentially the same manner by placing speed data in circuits 162 and 163, by positioning movable member 135, and by then actuating one-shot circuit 204.

When a program point is to be recorded which is reached by traveling in a counterclockwise direction, a corresponding position mark is similarly recorded by actuating "change direction" one-shot circuit 203 instead of one-shot circuit 204. The output pulse developed by one-shot circuit 203 is applied to the symmetrical input of binary circuit 207 causing this circuit to change to the "1" state, thereby conditioning AND circuit 209. Delay circuit 206 provides sufficient time delay to permit binary circuit 207 to change state before the pulse from one-shot circuit 203 can be applied to the other input of AND circuit 209. Thus, the pulse developed by one-shot circuit 203 eventually passes through OR circuit 201, delay circuit 206, conditioned AND circuit 209, to place flip-flop circuit 211 in the "1" state, thereby conditioning AND circuit 213. As soon thereafter as read head 200 detects the reference mark, a reference pulse is developed which passes through conditioned AND circuit 213 to actuate read-write head 120 to record a position mark on disc 110. The reference pulse is also applied to the reset input of flip-flop circuit 211, again placing this circuit in the "0" state. The pulse developed by one-shot circuit 203 is also applied to the set input of flip-flop circuit 162 causing this circuit to assume the "1" state. The pulse from one-shot circuit 203 also passes through OR circuit 201 and places flip-flop circuit 220 in the "1" state conditioning AND circuit 161, and the same pulse, after passing through OR circuit 201, is applied to the start input of electric motor 151 via OR circuit 221. When read-write head 185 detects a timing mark, a pulse is developed which passes through conditioned AND circuit 161, causing a transfer of data from flip-flop circuits 162–164 to the magnetic tape. It should be noted that the read-write head 184, which is associated with flip-flop circuit 164, records a magnetic mark representing a "1," since one-shot circuit 203 was actuated instead of one-shot circuit 204. As many additional successive program points as can be reached by traveling in the counterclockwise direction are thereafter recorded by appropriately positioning movable member 135 and actuating "same direction" one-shot circuit 204 causing additional position marks to be recorded on side 112 of disc 110.

Thereafter, when it is desired to record a program point which is reached by again traveling in the clockwise direction, movable member 135 is positioned and "change direction" one-shot circuit 203 is actuated. The output pulse developed by the one-shot circuit is applied to binary circuit 207 which changes to the "0" state again conditioning AND circuit 208. The pulse from the one-shot circuit also passes through OR circuit 201, and after a suitable delay caused by delay circuit 205, passes through conditioned AND circuit 208 to initiate the recording of a position mark on side 111 of disc 110. When binary circuit 207 changes to the "0" state, a positive pulse is applied to one-shot circuit 223 via OR circuit 222, causing one-shot circuit 223 to develop an electrical pulse energizing digital motor 133. The digital motor, when energized, indexes read-write heads 120 and 121 inwardly to an adjacent pair of tracks. The time delay of circuit 205 is sufficient to permit the indexing operation to take place before the pulse from OR circuit 201 is applied to AND circuit 208. Additional program points are recorded in this fashion until the complete program is recorded on disc 110.

The circuits which, during the playback mode, detect the simultaneous occurrence of position marks and reference marks include two three-input AND circuits 225 and 226, these AND circuits being of the type which provide an output potential whenever all three-inputs are simultaneously energized. One input of AND circuit 225 is connected to read-write head 121 via a pulse amplifier 227 and a switch 228 to receive the pulses developed by the read-write head. Another input of AND circuit 225 is connected to amplifier 202 to receive reference pulses, and the remaining input of AND circuit 225 is connected to the reset output of flip-flop circuit 154. Similarly, one input of AND circuit 226 is connected to receive pulses from read-write head 120 via switch 230 and pulse amplifier 229. Another input of AND circuit 226 is connected to receive reference pulses from amplifier 202, and the remaining input is connected to the set output of flip-flop circuit 154. The outputs from AND circuits 225 and 226 are connected to separate inputs of four-input OR circuit 221. The remaining input of OR circuit 221 is connected to the output of a one-shot multivibrator circuit 231 which is actuated providing an electrical pulse when the playback operation is to start.

In beginning the playback operation, movable member 135 and tape 155 are placed in their initial position and read-write heads 120 and 121 are positioned at radial positions corresponding to the outermost pair of tracks on disc 110. Circuits 150 and 152–154 are placed in the "0" state. When circuit 154 is in the "0" state, directional coupler 144 is conditioned to rotate shaft 124 in the clockwise direction and AND circuit 225 is conditioned. Switches 191, 228 and 230 are closed, and then one-shot circuit 231 is actuated to initiate the playback operation. The pulse from one-shot circuit 231 passes through OR circuit 221 to actuate motor 151 causing tape 155 to advance. When the first timing mark is detected by read-write head 185, flip-flop circuit 150 is placed in the "1" state, releasing brake 141 and energizing motor 140. Also, when this timing mark is detected, the corresponding data for the first position mark is transferred from the magnetic tape to flip-flop circuits 152 and 153 to selectively actuate speed reduction units 142 and 143 such that shaft 124 rotates at the appropriate speed for reaching the first position mark. There is no change of direction pulse corresponding to the first program point and, therefore, binary circuit 154 remains in the "0" state.

As shaft 124 rotates, movable member 135 moves along its longitudinal axis and read-write heads 121 and 120 rotate with respect to disc 110. When read-write head 121 reaches the appropriate angular position corresponding to the angular displacement between the first position mark and reference mark 201, pulses are simultaneously developed by read-write head 121 and read head 200 and, therefore, AND circuit 225 produces an output pulse. This output pulse passes through OR circuit 221 and is applied to the reset input of flip-flop circuits 150, 152 and 153 placing these circuits in the "0" state. When this occurs, the brake is applied, the motor is deenergized, and flip-flop circuits 152 and 153 are conditioned for a new set of data from tape 155. The pulse passing through OR circuit 221 is also applied to start rotation of electric motor 151 such that a new set of data is extracted from tape 155 and transferred to circuits 150, 152, 153 and 154. There is no pulse applied to binary circuit 154, so long as the successive program points are reached by traveling in the same clockwise direction, successively positioning movable member 135, in accordance with the successive clockwise program points.

When a program point is reached requiring a change of direction, a pulse will be developed by read-write head 184 to change the state of binary circuit 154. When binary circuit 154 changes to the "1" state, directional coupler 144 is conditioned for counterclockwise rotation of shaft 124, and AND circuit 226 is conditioned instead of AND circuit 225. Shaft 124 then rotates positioning movable member 135 and read-write head 120 in accordance with the next successive position marks corresponding to the counterclockwise group of position points in like fashion.

When the next clockwise position point is reached, binary circuit 154 is again actuated changing to the "0" state. When this occurs, one-shot circuit 223 is actuated in turn actuating digital motor 133 to index read-write heads 120 and 121 to the adjacent track. AND circuit 225 is also again conditioned, and, therefore, movable member 135 is positioned in accordance with the next succession of clockwise program points. The operation continues in this manner until the program is completed.

There is a definite relationship between the resolution, the speed at which the disc must rotate, and the maximum speed at which the movable head can rotate. For the purposes of this specification, resolution can be defined in terms of a resolution angle $2\alpha$ where this resolution angle represents the range of positions the movable head could have when coincidence is detected between pulses from the movable and stationary heads. Thus, if a position mark is recorded at an angular displacement $\theta$ with respect to the reference mark, coincidence during the playback operation indicates that the movable head is angularly displaced from the stationary head by an angle $\theta \pm \alpha$. The principal factors affecting the resolution angle are the widths of the position and reference marks and of the movable and stationary heads.

Coincidence can be detected only when the movable head is disposed at an angle $\theta \pm \alpha$ relative to the stationary head. When the movable head is moving, the time interval during which coincidence can be detected is the time required for the movable head to travel a distance corresponding to the angle $2\alpha$. During this time interval, the disc must make a complete revolution to insure that a reference pulse is generated during the time interval. Since there is a practical limit on the maximum permissible disc speed, the resolution and maximum speed at which the movable head can rotate must be adjusted accordingly. In other words, it is necessary to reduce the maximum permissible speed of the movable head as the resolution is increased and vice versa. In most installations, the apparatus can be designed to operate at a suitable compromise between maximum head speed and resolution. It should be noted that the resolution must be proper with respect to the disc speed and movable head speed, as otherwise the apparatus could miss recorded position marks.

Where it is necessary to have both high resolution and a high angular speed for the movable head, this can be accomplished by using two program points and making the resolution a function of the speed at which the movable head rotates. Accordingly, the first program point would cause the head to move at a high angular speed with poor resolution to the approximate location and the second program point would cause the movable head to move at a slow angular speed and high resolution to the exact desired location.

One method of degrading resolution is to effectively increase the width of the position mark by recording a number of closely spaced position marks instead of a single position mark. Since coincidence can occur with respect to any one of these closely spaced marks, the resolution angle $2\alpha$ is increased and resolution is decreased accordingly. The number of closely spaced marks recorded during the record operation would be a function of the speed at which the movable head is to move during the playback operation.

Another method of degrading resolution is to increase the length of the pulse developed by the heads as a function of the movable head angular speed. This could be accomplished, for example, by connecting a variable pulse length one-shot multivibrator in series with either input to AND circuit 101 (FIG. 1). The one-shot circuit could be connected to flip-flop circuits 32 and 33 to change the length of the output pulse in accordance with the binary number stored in the flip-flop circuits. By increasing the time duration of either of the pulses applied to AND circuit 101, the time interval during which coincidence can be detected is increased and, therefore, the resolution angle $2\alpha$ is increased accordingly.

Still another method of degrading resolution is by means of apparatus shown in FIG. 3 where the width of the stationary head is effectively increased as a function of the speed of the movable head. The FIG. 3 apparatus is shown as a modification of FIG. 1 and like references are employed but, this modification could similarly be adapted in the FIG. 2 embodiment. A second read head 240, similar to read head 90 and responsive to the reference mark on the periphery of disc 1, is positioned by a suitable positioning mechanism 241 at various distances from head 90. The positioning mechanism 241 can be connected to flip-flop circuits 32 and 33 to automatically space head 240 at increasing distances from head 90 as the speed of shaft 18 increases. The output from head 240 is connected to the set input of a flip-flop multivibrator circuit 242 via a pulse amplifier 243, and the output of read head 90 is connected to the reset input of circuit 242 via pulse amplifier 91. The set-output of circuit 242 is connected to one input of AND circuit 101, the other input to the AND circuit being connected to read-write head 7 as before. Read head 90 is also connected to circuits 93 and 92 as before.

Circuit 242 is placed in the "1" state, conditioning AND circuit 101, when the reference mark passes adjacent read head 90, and remains in the "1" state until read head 240 subsequently detects the reference mark. Thus, the time during which AND circuit 101 is conditioned, and therefore the time during which coincidence can be detected, is a function of the spacing between heads 90 and 240 which in turn is a function of the angular speed of read-write head 7. The effect of heads 90 and 240 and flip-flop circuit 242 is the same as a variable width stationary head, and, therefore, the resolution angle $2\alpha$ increases directly with the increased spacing between the heads. Accordingly, resolution is degraded as a function of the speed of movable head 7 during the playback operation.

While several specific embodiments have been illustrated, these by no means exhaust all possible embodiments of this invention. For example, recording media of other types and shapes can be utilized; movable members of virtually any known type can be positioned by the apparatus; and auxiliary control apparatus of a variety of different known types can be used. The invention is more specifically defined in the appended claims.

What is claimed is:

1. In automatic positioning apparatus the combination of
    a movable member;
    and endless continuously moving recording medium having a reference mark thereon;
    a first transducer responsive to said reference mark and a second transducer positioned adjacent the recording surface of said medium,
    said transducers being relatively positionable such that the position of one of said transducers with respect to the other is always a function of the movable member position;
    read-write circuit means connected to said transducers,
        operative to selectively energize said second transducer to record a position mark on said medium only when said reference mark is detected by said first transducer, and
        responsive to previously recorded position marks detected by said second transducer when said first simultaneously detects said reference mark.

2. Apparatus in accordance with claim 1 wherein said recording medium is a continuously rotating magnetic disc.

3. Apparatus in accordance with claim 1 wherein said first transducer is stationary and said second transducer is positionable in accordance with the movable member position.

4. In position recording apparatus the combination of
    a movable member;
    an endless continuously moving recording medium having a reference mark thereon;
    a first transducer responsive to said reference mark;
    a second transducer for recording position marks on said medium when energized,
        said transducers being relatively positionable such that the position of one of said transducers with respect to the other is a function of the movable member position
    recording circuit means connected to said first and second transducers which is conditioned when said movable member is at a location corresponding to a position mark which is to be recorded, said recording circuit means being operative, when conditioned, to energize said second transducer in response to said first transducer detecting said reference mark.

5. Apparatus in accordance with claim 4 wherein said recording medium is a continuously rotating magnetic disc having a plurality of concentric recording tracks thereon;

and wherein the apparatus further comprises
    indexing means connected to said second transducer to index the same to radial positions with respect to the center of the disc corresponding to the different concentric tracks.

6. Apparatus in accordance with claim 5 wherein said first transducer is stationary.

7. In apparatus for recording a multipoint position program, the combination of
a movable member;
an endless multitrack continuously moving recording medium;
a transducer for recording a position mark on said medium at a location indicative of a corresponding movable member position when energized;
indexing means for indexing said transducer to an adjacent track when actuated;
circuit means for energizing only said transducer when a position mark is to be recorded on the same track as a previous position mark and for actuating said indexing means and, shortly thereafter, energizing said transducer when a position mark is to be recorded on an adjacent track.

8. In automatic positioning apparatus the combination of
a movable member to be positioned;
an endless continuously moving recording medium having thereon a reference mark and at least one recorded position mark located at a position relative to said reference mark indicative of a desired movable member position;
first and second transducers positionable with respect to one another in accordance with the position of said movable member,
    said first transducer being responsive to said reference mark, and
    said second transducer being responsive to said position mark;
driving means for moving said movable member when activated; and
circuit means responsive to the simultaneous detection of a mark by said first and second transducers to deactivate said driving means.

9. Apparatus in accordance with claim 8 wherein said recording medium is a continuously rotating magnetic disc.

10. In automatic positioning apparatus the combination of
a movable member to be positioned;
a continuously rotating multitrack magnetic disc having a reference mark and at least one position mark recorded on each of the tracks at an angular position with respect to said reference mark indicative of a corresponding desired movable member position;
first and second transducers positionable with respect to one another at an angular displacement corresponding to the movable member position,
    said first transducer being responsive to said reference mark, and
    said second transducer being responsive to said position marks;
indexing means for indexing said second transducer to an adjacent track when actuated;
driving means for moving said movable member when activated;

first circuit means for initially activating said driving means; and
second circuit means for deactivating said driving means and actuating said indexing means, and for then again activating said driving means, when the last position mark on a track and said reference mark are simultaneously detected, respectively, by said second and first transducers.

11. In automatic positioning apparatus the combination of
a movable member to be positioned;
a continuously rotating magnetic disc having a reference mark and a plurality recording track pairs thereon;
    one track of each pair having at least one position mark recorded thereon at a location relative to said reference mark indicative of a movable member position which is reached by urging said movable member in a first direction, and
    the other track of each pair having at least one similar position mark indicative of a position which is reached by urging said movable member in the opposite direction;
a pair of alternately operable transducers responsive to position marks recorded in the different tracks of a pair, said pair of transducers being positionable with respect to said rotating disc in accordance with the movable member position;
a third transducer responsive to said reference mark;
bidirection driving means for moving said movable member;
indexing means for indexing said pair of transducers to an adjacent pair of tracks when actuated;
first conduit means for initially activating said driving means;
second circuit means for momentarily deactivating said bidirectional driving means when a position mark and said reference mark are simultaneously detected by said transducers;
third circuit means for activating a different one of said alternately operable transducers and for changing direction of said bidirectional driving means when the last position mark in a track and said reference mark are simultaneously detected by said transducers; and
third circuit means for actuating said indexing means when the last position mark in said other track of each pair and said reference mark are detected simultaneously by said transducers.

12. In automatic positioning apparatus the combination of
a movable member to be positioned;
a continuously rotating magnetic disc having recorded thereon at least one magnetic position mark at a location thereon indicative of a desired movable member position;
a transducer positionable with respect to said rotating disc in accordance with the position of the movable member and responsive to said position mark;
circuit means which is activated for a predetermined time interval once during each revolution of said disc; and
driving means for moving said movable member when activated, said driving being deactivated by said circuit means when said position mark is detected during said predetermined time interval.

13. Apparatus in accordance with claim 12 wherein the duration of said predetermined time interval is varied in accordance with the relative speed of said transducer and said rotating disc.

14. Apparatus in accordance with claim 12 wherein a reference mark is recorded on said disc and wherein said apparatus further comprises an additional pair of transducers, each responsive to said reference mark and spaced from one another in accordance with the relative speed between said transducer and said rotating disc, said pair of transducers being so connected to said circuit means that said circuit means is activated during the time interval required for said reference mark to travel between said pair of transducers.

15. In automatic positioning apparatus the combination of
- a movable member to be positioned;
- a continuously rotating magnetic disc having a reference mark and a position mark recorded at an angle $\theta$ with respect to said reference mark;
- a transducer responsive to said position mark and positionable such that the angular displacement between said transducer and a reference position is always a function of the movable member position;
- driving means for moving said movable and first circuit means for initially activating said driving means;
- second circuit means for deactivating said driving means when said transducer has an angular displacement $\theta \pm \alpha$ with respect to said reference position; and
- means within said second circuit means for varying the angle $\alpha$ in accordance with the speed at which said movable member is driven by said driving means.

References Cited

UNITED STATES PATENTS 3,258,750   6/1966   Shew _____ 340—174..1

DARYL W. COOK, *Acting Primary Examiner.*